(12) United States Patent
Scheps

(10) Patent No.: US 6,404,785 B1
(45) Date of Patent: Jun. 11, 2002

(54) SOLID STATE MODULATED ULTRAVIOLET LASER

(75) Inventor: Richard Scheps, Rancho Santa Fe, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/021,731

(22) Filed: Feb. 11, 1998

(51) Int. Cl.[7] .................................................. H01S 3/10
(52) U.S. Cl. ............................................. 372/21; 372/75
(58) Field of Search ............................ 372/60, 23, 64, 372/122, 21, 22, 75; 385/122

(56) References Cited

U.S. PATENT DOCUMENTS

| | | |
|---|---|---|
| 4,949,348 A | 8/1990 | Nguyen et al. |
| 5,008,890 A | 4/1991 | McFarlane |
| 5,144,630 A | 9/1992 | Lin |
| 5,297,156 A | 3/1994 | Deacon |
| 5,436,919 A | 7/1995 | Chwalek et al. |
| 5,513,196 A * | 4/1996 | Bischel et al. ................ 372/22 |
| 5,530,709 A | 6/1996 | Waarts et al. |
| 5,621,749 A | 4/1997 | Baney |
| 5,796,902 A * | 8/1998 | Bhat et al. .................... 372/22 |
| 5,802,086 A * | 9/1998 | Hargis et al. ................. 372/22 |
| 5,802,232 A * | 9/1998 | Bhat et al. ................... 385/122 |

* cited by examiner

*Primary Examiner*—James W. Davie
(74) *Attorney, Agent, or Firm*—Harvey Fendelman; Michael A. Kagan; Andrew Cameron

(57) ABSTRACT

A solid state modulated ultraviolet laser comprises a laser diode for generating modulated optical energy, a waveguide upconversion laser for converting a portion of the modulated optical energy to upconversion optical energy, and a waveguide sum frequency generator for combining the modulated optical energy and the upconversion optical energy to generate a modulated ultraviolet signal.

8 Claims, 3 Drawing Sheets

PHOTON AVALANCHE UPCONVERSION LASER OUTPUT POWER

TIME

UPCONVERSION LASER OUTPUT POWER

TIME

SOLID STATE MODULATED ULTRAVIOLET LASER

BACKGROUND OF THE INVENTION

The present invention relates generally to lasers and particularly to upconversion lasers, sum frequency generation, optical waveguides, and waveguide lasers.

Upconversion lasers are among the most efficient sources of coherent visible and near-ultraviolet radiation. The term "upconversion" is well known in the art and generally refers to emission of optical energy having a frequency that exceeds that of the pumping frequency.

One way to convert fundamental infrared emission to visible light relies on non-linear optical techniques such as harmonic generation or optical parametric oscillation. Most solid state lasers produce fundamental radiation in the infrared. For example Nd:YAG is a trivalent neodymium ion-doped solid state laser which operates at several infrared wavelengths including 1.06 $\mu$m and 1.3 $\mu$m. Another common solid state laser is Ti:sapphire, a commercially available trivalent transition ion-doped tunable laser with a peak emission wavelength at approximately 780 nm.

Crystalline upconversion laser gain elements typically contain a trivalent rare earth ion doped in a suitable oxide or fluoride host crystal. An upconversion laser gain element differs from traditional gain elements in that the activator ion doping concentration is relatively high. However, some crystal hosts and activator ions that produce efficient traditional (non-upconversion) laser-emission are not capable of producing upconversion laser emission.

Most demonstrations of upconversion laser emission have taken place in fluoride hosts. The fluoride host is preferred because its low phonon frequencies produce long lifetimes for the metastable states involved in the upconversion process.

Few demonstrations of upconversion laser emission in oxide-containing crystal hosts are known. The trivalent rare earth ions (or activator ions) that have demonstrated upconversion laser emission are $Pr^{3+}$, $Nd^{3+}$, $Ho^{3+}$, $Er^{3+}$, and $Tm^{3+}$. Upconversion laser emission is known in a non-halide-containing crystal of Tm:YAG at a wavelength of 486 nm. YAG is an oxide containing garnet structure with a chemical formula $Y_3Al_5O_{12}$. In addition, Er:YAG has produced upconversion laser emission at 561 nm. The power output of these gain elements is relatively low compared to the levels required for many application.

Er:YALO denotes an yttrium orthoaluminate crystal doped with trivalent erbium ions. YALO is an acronym for a crystal with the chemical formula $YAlO_3$. The proper name for this crystal is yttrium orthoaluminate. The crystal is commonly referred to as YALO, or alternatively, YAP. The "P" stands for perovskite. There are numerous difficulties that must be overcome to produce efficient-upconversion in an oxide-containing crystalline host such as YALO or YAG. A motivation for overcoming these difficulties is that a solid state upconversion laser may be used in generating laser radiation at ultraviolet frequencies useful for semiconductor manufacturing applications, particulary if the ultraviolet radiation may be modulated.

A continuing need therefore exists for a solid state ultraviolet laser capable of being modulated.

SUMMARY OF THE INVENTION

A solid state modulated ultraviolet laser of the present invention comprises a laser diode for generating modulated optical energy, a waveguide upconversion laser for converting a portion of the modulated optical energy to upconversion optical energy, and a waveguide sum frequency generator for combining the modulated optical energy and the upconversion optical energy to generate a modulated ultraviolet signal.

An advantage of the solid state modulated ultraviolet laser of the present invention is that the optical conversion efficiency is higher than that of conventional photon avalanche upconversion lasers.

Another advantage is that the ultraviolet output may be modulated up to gigahertz rates by the electrical signal applied to the laser diode.

DESCRIPTION OF THE INVENTION

Figure 1:
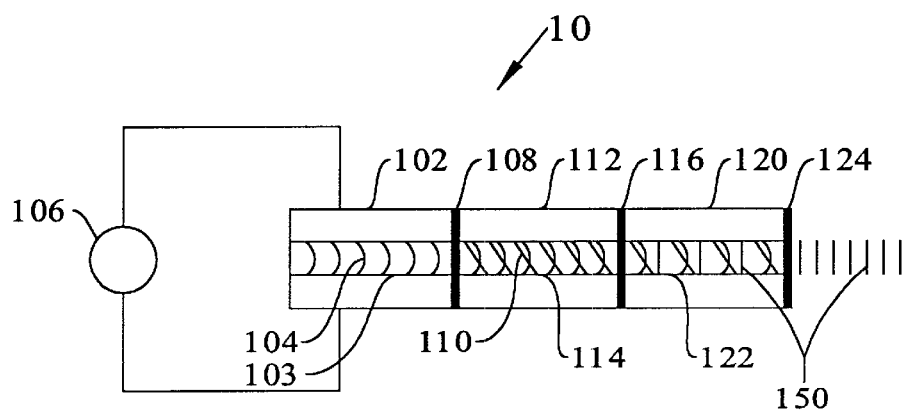
FIG. 1 is a diagram of a solid state modulated ultraviolet laser of the present invention.

FIG. 1 shows a diagram of an exemplary solid state modulated ultraviolet laser 10 of the present invention. The pumping source may be an infrared stripe laser diode 102, for example, a Sony model SLD304V. Laser diode 102 generates modulated infrared optical energy 104 in response to a modulation signal from modulator 106. Modulator 106 may be, for example, a radio frequency amplifier appropriately biased near the laser threshold of laser diode 102 for generating an amplitude modulated RF signal. A first coating 108 may be included in upconversion laser 112 that is highly transmissive of infrared optical energy 104 and highly reflective of upconverted optical energy 110 to improve the optical efficiency of solid state modulated ultraviolet laser 10.

Upconverted optical energy 110 is generated by waveguide upconversion laser 112 in response to infrared optical energy 104 coupled through first coating 108. Waveguide upconversion laser 112 may be for example, an Er:YALO crystal rod having a waveguide region 114 formed by for example, diffusion bonding or by ion implantation according to well known techniques. Ion concentrations in waveguide region 114 may be, for example, 1.5 atom-% $Er^{3+}$ ions. Waveguide region 114 is preferably aligned and matched in size with stripe 103 of single stripe laser diode 102. Other activator ions doped in YALO and other host materials may also be used for waveguide upconversion laser 112. Suitable materials for the crystalline host material in waveguide upconversion laser 112 include yttrium orthoaluminate, YAG and various crystalline fluorides such as yttrium lithium fluoride. Suitable dopant ions for waveguide region 114 include trivalent erbium ions, trivalent praseodymium ions, trivalent neodymium ions, trivalent holmium ions, trivalent thulium ions or other rare earth ions. A second coating 116 may be included with waveguide upconversion laser 112 that is highly transmissive of infrared optical energy 104, partially reflective of upconversion optical energy 110, and highly reflective of ultraviolet optical energy 150 to improve the optical efficiency of solid state modulated ultraviolet laser 10.

The percentage of reflectivity of upconversion optical energy 110 by second coating 116 may be varied from about 5% to 99% to produce a maximum power output from waveguide upconversion laser 112. Upconversion optical energy 110 may be amplitude modulated by varying the amplitude of electrical drive from modulator 106 applied to laser diode 102.

A sum frequency generator 120 having a waveguide geometry similar in shape to that of waveguide upconversion laser 112 generates ultraviolet optical energy 150 by combining infrared optical energy 104 and upconversion optical energy 110 through second coating 116 to generate a sum frequency output signal. A suitable composition for waveguide region 122 of sum frequency generator 120 is crystalline potassium niobate or lithium niobate. A third coating 124 that is highly reflective of infrared optical energy 104 and upconversion optical energy 110 and highly transmissive of ultraviolet optical energy 150 may be added to improve the optical efficiency of solid state modulated ultraviolet laser 10. Ultraviolet optical energy 150 may be amplitude modulated at gigahertz rates by modulating infrared optical energy 104 generated by laser diode 102.

Laser diode 102, waveguide upconversion laser 112, and sum frequency generator 120 have waveguide regions having a matching shape and are aligned for confining infrared optical energy 104, upconversion energy 110, and ultraviolet optical energy 150 substantially within the waveguide regions. Ultraviolet optical energy 150 (the output signal of laser 10) may be modulated at gigahertz rates by the modulating electrical drive applied to laser diode 102.

In operation, modulator 106 provides an electrical signal to stripe laser diode 102. Laser diode 102 generates waveguided infrared optical energy 104 modulated by modulator 106 that passes through first coating 108 to waveguide upconversion laser 112. The wavelength of infrared optical energy 104 is selected so that optical energy 104 is about 5% to 10% absorbed by waveguide upconversion laser 112 and so that the log of the upconversion laser power output is substantially linear with respect to the log of pump input power. Waveguide upconversion laser 112 waveguides modulated infrared optical energy 104 through waveguide region 114 and generates upconversion optical energy 110. A portion of infrared optical energy 104 preferably is passed through waveguide upconversion laser 112 to sum frequency generator 120. Upconversion optical energy 110 may be partially reflected by second coating 116 so that it passes back through waveguide upconversion laser 112 to be highly reflected back again by first coating 108 to generate laser emission from waveguide upconversion laser 112. Upconversion optical energy 110 passes through partially reflective second coating 116 along with modulated infrared optical energy 104 to sum frequency generator 120. Sum frequency generator 120 generates an output signal of ultraviolet optical energy 150 in response to infrared optical energy 104 combined with upconversion optical energy 110. Ultraviolet optical energy 150 is transmitted through third coating 124. Infrared optical energy 104 and upconversion optical energy 110 may be highly reflected by output coating 124 back through sum frequency generator 120 and partially reflected by second coating 116.

Figure 2:
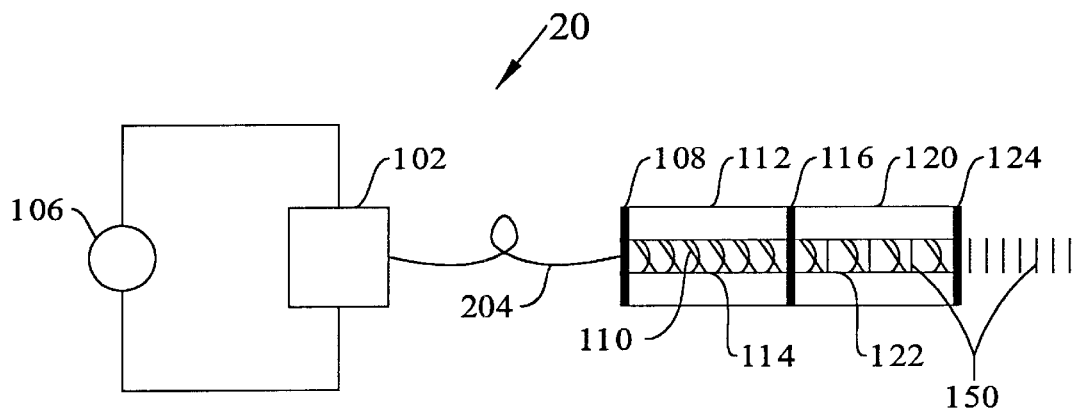
FIG. 2 is a diagram of a solid state modulated ultraviolet laser of the present invention in which the pump signal is coupled by an optical fiber.

FIG. 2 is a diagram of another embodiment of a solid state modulated ultraviolet laser 20 of the present invention. In this embodiment a laser diode 102 is coupled to waveguide upconversion laser 112 by an optical fiber 204, and waveguide upconversion laser 112 and sum frequency generator 120 are waveguide matched to optical fiber 204 so that modulated infrared optical energy 104 is substantially contained by and propagated through upconversion laser 112 and sum frequency generator 120. Operation of modulated ultraviolet laser 20 is similar to that of modulated ultraviolet laser 10.

Figure 3:
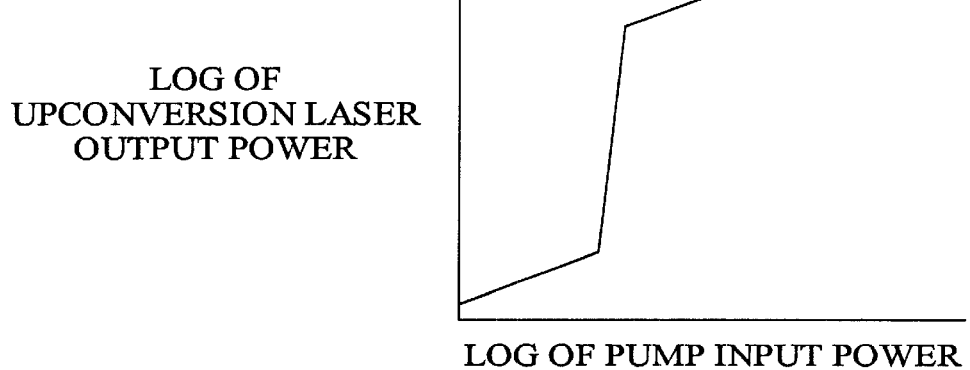
FIG. 3 is a log plot of upconversion laser output power vs. pump input power for photon avalanche upconversion lasers of the prior art.
Figure 4:
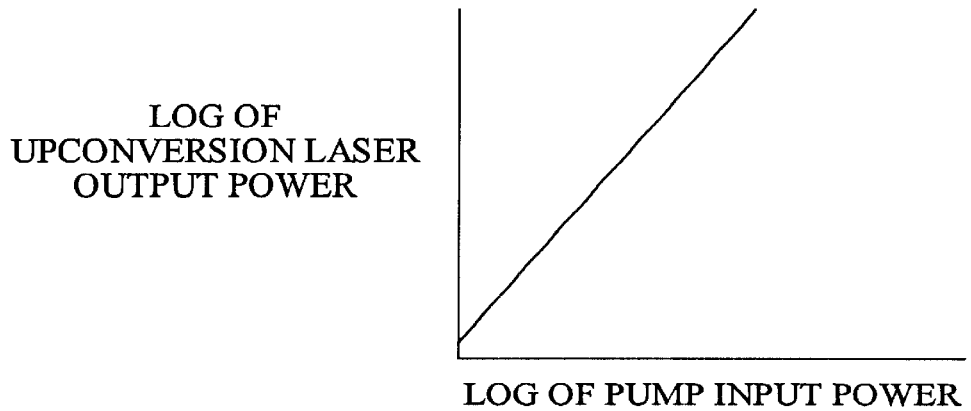
FIG. 4 is a log plot of upconversion laser output power vs. pump input power for the upconversion laser of the present invention.

FIG. 3 shows a log plot of upconversion output power vs. pump input power for a typical photon avalanche upconversion laser of the prior art. FIG. 4 shows a plot of upconversion output power vs. pump input power for the waveguide upconversion laser used in the present invention. The linear dependence of the log of the upconversion output power with respect to pump input power in the present invention as shown in FIG. 4 allows a greater modulation frequency range than that resulting from the nonlinear dependence of the log of the upconversion output power with respect to pump input power of the photon avalanche upconversion laser shown in FIG. 3.

Figure 5:
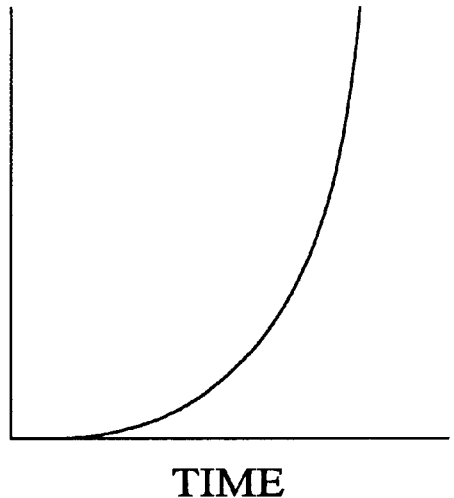
FIG. 5 is a plot of upconversion laser power output vs. time for a photon avalanche upconversion laser of the prior art.
Figure 6:
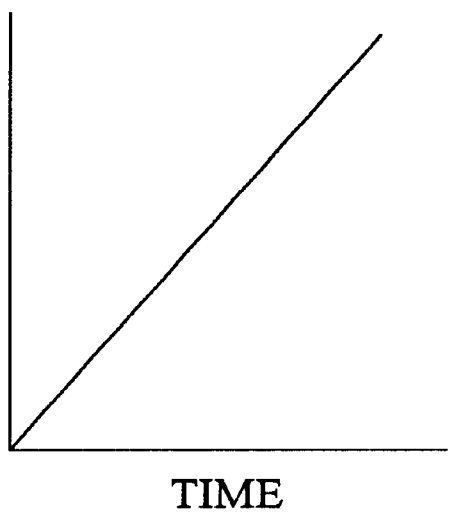
FIG. 6 is a plot of upconversion laser power output vs. time for an upconversion laser of the present invention.

FIG. 5 shows a plot of upconversion laser output power over time in response to a pump excitation pulse for a typical photon avalanche upconversion laser of the prior art. FIG. 6 shows a plot of upconversion laser output power over time in response to a pump excitation pulse for the waveguide upconversion laser of the present invention. The linearity of FIG. 6 results from the selection of the wavelength of pump optical energy 104 in contrast to the typically quadratic response of a photon avalanche upconversion laser of the prior art.

Alternatively, laser diode 102 may be a visible laser diode used with an infrared or a visible waveguide upconversion laser 112 to produce ultraviolet optical energy 150.

Various modifications and variations of the present invention may be possible within the scope of the following claims to practice the invention otherwise than described above.

I claim:

1. A solid state laser comprising:
   a laser diode for generating waveguided pump optical energy having a pump frequency;
   a waveguide upconversion laser coupled to the laser diode for generating upconverted optical energy having an upconversion frequency;
   and a waveguide sum frequency generator coupled to the waveguide upconversion laser for generating an output signal having a frequency substantially equal to the sum of the pump frequency and the upconversion frequency.

2. The solid state laser of claim 1 wherein the laser diode, the waveguide upconversion laser, and the waveguide sum frequency generator are substantially waveguide matched and aligned.

3. The solid state laser of claim 1 wherein the pump optical energy is amplitude modulated.

4. The laser of claim 3 wherein the output signal is amplitude modulated.

5. The solid state laser of claim 1 wherein the waveguide upconversion laser comprises a crystal rod made of one of yttrium orthoaluminate, yttrium aluminum garnet, and yttrium lithium fluoride wherein the crystal rod has a waveguide region doped with one of trivalent erbium ions, trivalent praseodymium ions, trivalent neodymium ions, trivalent holmium ions, and trivalent thulium ions.

6. The solid state laser of claim 1 wherein the waveguide sum frequency generator has a waveguide region comprising one of potassium niobate and lithium niobate.

7. A solid state laser comprising:
a laser diode for generating pump optical energy having a pump frequency;
an optical fiber coupled to the laser diode;
a waveguide upconversion laser coupled to the optical fiber for generating upconverted optical energy having an upconversion frequency;
and a waveguide sum frequency generator coupled to the waveguide upconversion laser for generating an output signal having a frequency substantially equal to the sum of the pump frequency and the upconversion frequency.

8. A solid state laser comprising:
a laser diode for generating waveguided pump optical energy having a pump frequency wherein the waveguided pump optical energy is amplitude modulated;
a waveguide upconversion laser coupled to the laser diode by one of waveguide matching and an optical fiber for generating upconverted optical energy having an upconversion frequency wherein the waveguide upconversion laser comprises a crystal rod that is made of one of yttrium orthoaluminate, yttrium aluminum garnet, and yttrium lithium fluoride and has a waveguide region doped with one of trivalent erbium ions, trivalent praseodymium ions, trivalent neodymium ions, trivalent holmium ions, and trivalent thulium ions wherein the modulated pump optical energy passes through the waveguide region and has a wavelength selected to generate a modulated upconversion signal having substantially linear output power over time; and
a waveguide sum frequency generator having a waveguide region comprising one of potassium niobate and lithium niobate coupled to the waveguide upconversion laser for generating an amplitude modulated output signal having a frequency substantially equal to the sum of the pump frequency and the upconversion frequency wherein the waveguide upconversion laser and the waveguide sum frequency generator are substantially waveguide matched and aligned.

* * * * *